(12) United States Patent
Inamdar et al.

(10) Patent No.: US 10,824,744 B2
(45) Date of Patent: Nov. 3, 2020

(54) SECURE CLIENT-SERVER COMMUNICATION

(71) Applicant: Cisco Technology, Inc., San Jose, CA (US)

(72) Inventors: Kaustubh Inamdar, Bangalore (IN); Gonzalo Salgueiro, Raleigh, NC (US); Sebastian Jeuk, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 241 days.

(21) Appl. No.: 15/891,434

(22) Filed: Feb. 8, 2018

(65) Prior Publication Data
US 2019/0243980 A1 Aug. 8, 2019

(51) Int. Cl.
| G06F 21/60 | (2013.01) |
| --- | --- |
| H04L 29/06 | (2006.01) |
| H04L 9/32 | (2006.01) |
| H04L 9/06 | (2006.01) |
| H04L 9/08 | (2006.01) |
| H04L 9/30 | (2006.01) |

(52) U.S. Cl.
CPC .......... *G06F 21/606* (2013.01); *H04L 9/0637* (2013.01); *H04L 9/0643* (2013.01); *H04L 9/0861* (2013.01); *H04L 9/3013* (2013.01); *H04L 9/3066* (2013.01); *H04L 9/3228* (2013.01); *H04L 63/0272* (2013.01); *H04L 63/0428* (2013.01); *H04L 63/061* (2013.01); *H04L 63/162* (2013.01); *H04L 63/166* (2013.01); *H04L 67/42* (2013.01); *H04L 2209/38* (2013.01); *H04L 2463/061* (2013.01)

(58) Field of Classification Search
CPC .............. G06F 21/606; H04L 63/0272; H04L 63/0428; H04L 63/061; H04L 63/162; H04L 63/166; H04L 9/3013; H04L 9/3066; H04L 9/0861; H04L 9/0637; H04L 9/0643; H04L 6/3228; H04L 2463/061; H04L 2209/38; H04L 67/42
USPC ........................................................ 713/171
See application file for complete search history.

(56) References Cited

U.S. PATENT DOCUMENTS

| 9,578,016 B2 | 2/2017 | Shah | |
| --- | --- | --- | --- |
| 9,774,631 B2 | 9/2017 | Mazur et al. | |
| 2015/0379510 A1* | 12/2015 | Smith | H04L 9/3242 705/71 |

(Continued)

OTHER PUBLICATIONS

McCorry et al., Authenticated Key Exchange over Bitcoin, 2016, Research Gate (Year: 2016).*

(Continued)

*Primary Examiner* — Syed A Zaidi (57) ABSTRACT

In one embodiment, a client device includes an interface, a memory to store at least one part of a blockchain, and a processor to generate a client message indicating use of blockchain mode to establish a secure connection between the client device and a server, send the client message to the server on the interface, receive, from the server on the interface, a server message indicating use of the blockchain mode, and securely communicate with the server, on the interface, using at least one cryptographic key generated from information including cryptographic key generation information stored in the blockchain. Related apparatus and methods are also described.

20 Claims, 5 Drawing Sheets

(56) References Cited

U.S. PATENT DOCUMENTS

| | | |
|---|---|---|
| 2016/0094546 A1 | 3/2016 | Innes et al. |
| 2017/0329980 A1 | 11/2017 | Hu et al. |
| 2017/0353309 A1* | 12/2017 | Gray ................... G06Q 20/3829 |
| 2018/0183587 A1* | 6/2018 | Won ....................... H04L 9/3247 |
| 2018/0205561 A1* | 7/2018 | Le Saint ............... H04L 9/3242 |
| 2018/0309567 A1* | 10/2018 | Wooden .................. H04L 63/12 |
| 2018/0337769 A1* | 11/2018 | Gleichauf ............. H04L 9/3239 |
| 2019/0349426 A1* | 11/2019 | Smith ................... H04L 67/104 |

OTHER PUBLICATIONS

NPL Search Results (Year: 2020).*
Shacham, Hovav et al.; Client-Side Caching for TLS; ACM Transactions on Information and System Security (TISSEC) 7, No. 4 (2004): 553-575.

* cited by examiner

SECURE CLIENT-SERVER COMMUNICATION

TECHNICAL FIELD

The present disclosure generally relates to secure communication.

BACKGROUND

Client-server applications use the Transport Layer Security (TLS) protocol to communicate across a network in a way designed to prevent eavesdropping and tampering. Since applications may communicate either with or without TLS, the client indicates to the server the setup of a TLS connection. Once the client and server have agreed to use TLS, they negotiate a connection by using a handshaking procedure, and subsequently exchange encrypted traffic.

TLS 1.2 of the Internet Engineering Task Force (IETF) may be secure when configured correctly. In the last few years, several high profile attacks have been published that revealed flaws in the protocol. The IETF has been working on a new version of the protocol, TLS 1.3, which represents a major overhaul and has two main advantages over previous versions, namely, enhanced security and improved speed.

Datagram Transport Layer Security (DTLS) is a communications protocol that provides security for datagram-based applications. The DTLS protocol is based on the TLS protocol and is intended to provide similar security guarantees. The IETF is working on DTLS 1.3 to provide enhanced security and improved speed.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present disclosure, a client device including an interface, a memory to store at least one part of a blockchain, and a processor to generate a client message indicating use of blockchain mode to establish a secure connection between the client device and a server, send the client message to the server on the interface, receive, from the server on the interface, a server message indicating use of the blockchain mode, and securely communicate with the server, on the interface, using at least one cryptographic key generated from information including cryptographic key generation information stored in the blockchain.

There is also provided in accordance with an embodiment of the present disclosure, a server including an interface, a memory to store at least one part of a blockchain, a processor to receive, from a client device on the interface, a client message indicating use of blockchain mode to establish a secure connection between the client device and the server, generate a server message indicating use of the blockchain mode, send the server message to the server on the interface, and securely communicate with the client device, on the interface, using at least one cryptographic key generated from information including cryptographic key generation information stored in the blockchain.

DETAILED DESCRIPTION

Figure 1:
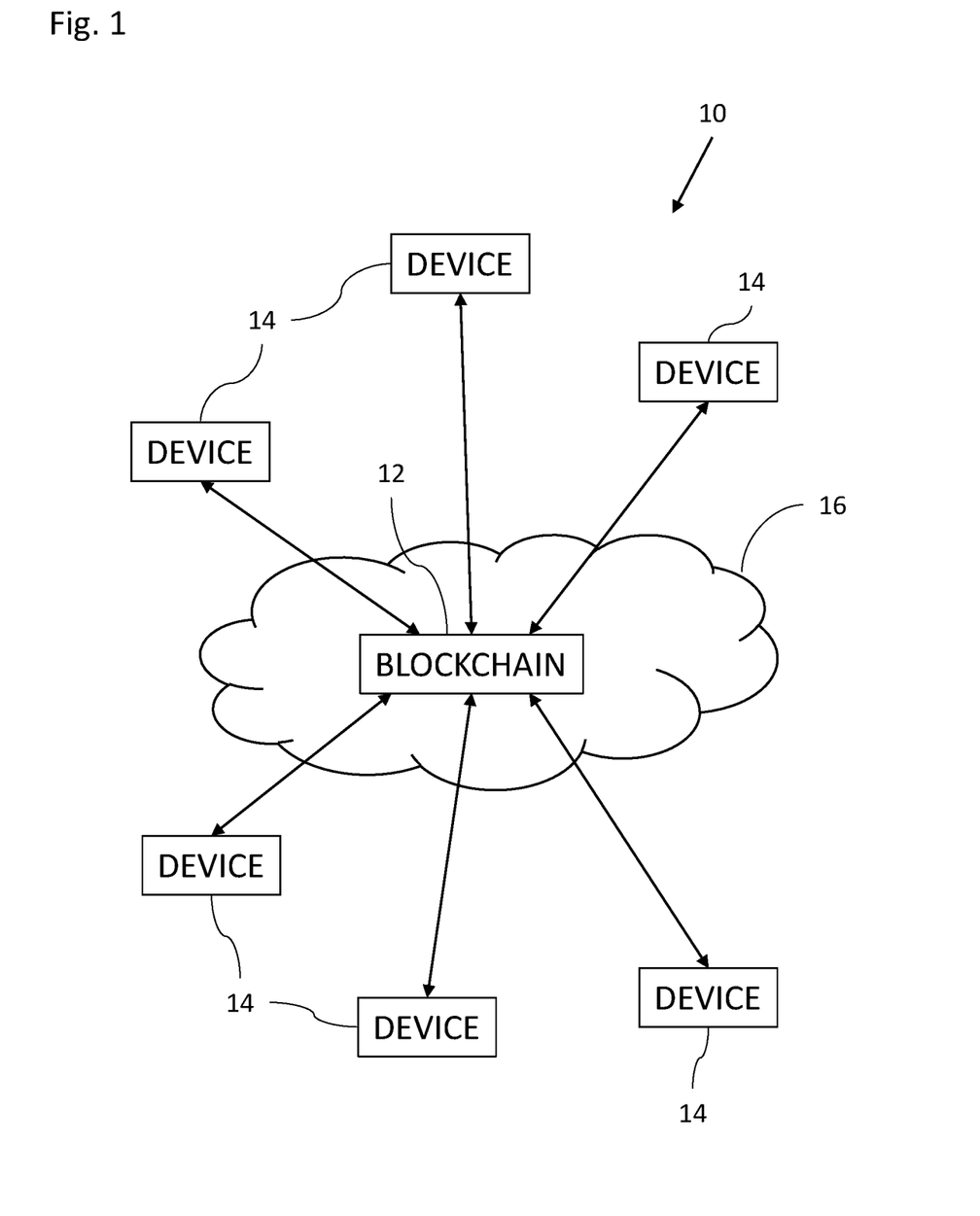
FIG. 1 is a block diagram view of a secure communication system constructed and operative in accordance with an embodiment of the present disclosure.

Reference is now made to FIG. 1, which is a block diagram view of a secure communication system 10 constructed and operative in accordance with an embodiment of the present disclosure. By way of introduction, like any communication network, an Internet of Things (IoT) network may be subject to a number of security attacks, aimed at gaining unauthorized access to data, tampering with data or even compromising devices. Constrained devices may secure data channels used to communicate with other constrained devices or centralized servers using the Datagram Transport Layer Security (DTLS) protocol or the Transport Layer Security (TLS) protocol of the Internet Engineering Task Force (IETF). The Constrained Application Protocol (CoAP) of the IETF provides three different methods with which a secure channel may be established within a constrained environment, namely, by using pre-shared keys, by using raw public keys, or by using certificates. The pre-shared keys and raw public keys methods have been optimized for use within a constrained environment, primarily to avoid the cost of Public Key Cryptography and the use of certificates.

Setting up a secure connection using any of the three methods includes a large number of handshake messages between a client device and a server or alternatively a large number of round trips between the client and server. The number of handshake messages may depend on the selected mode of security (pre-shared keys, raw public keys, or X.509 certificate based security), but in any event the number of handshake messages adds to the computational complexity of processing in a client device or server, and therefore, adds a processing delay to setting up a secure connection. The computational complexity may be particularly overwhelming for a constrained device such as an Internet of Things (IoT) device, by way of example only.

FIG. 1 shows a number of devices 14 connected via a network 16. One or more of the devices 14 may be a server serving a plurality of the other devices 14 (e.g., client devices). Some of the other devices 14 may be constrained devices, for example, but not limited to, IoT devices. The secure communication system 10 provides a mechanism for reducing the number of handshake messages in the setting up of a secure connection, thereby increasing setup speed, removing computation complexity involved in the handshake messages and improving the operation of a processor setting up the secure connection on a client device of the devices 14 and on a server of the devices 14. The secure communication system 10 uses one or more records in a blockchain 12 to provide information used in setting up the secure connection. Information from the blockchain 12 may be used by the client device and the server to generate cryptographic keys and setup the secure connection. The generated cryptographic keys are typically unique per secure connection because a key derivation algorithm provides sufficient randomness/entropy based on a random or pseudo-random nonce generated for each new secure connection, described in more detail below. The number of handshake messages may then be reduced to two handshake messages including a client-hello message and a server hello-message described in more detail with reference to FIGS. 3-5.

The devices 14 have read/write access to at least part of the blockchain 12. The read/write access to the blockchain 12 may be provided when the devices 14 are provisioned, before the devices are provisioned, or any time after the devices are provisioned. The blockchain 12 generally protects against unauthorized access to, and/or modification of, transaction records in the blockchain 12, and/or provides proof of ownership among other security features. Local copies of at least part of the blockchain 12 are generally stored in each of the devices 14 party to the blockchain 12.

In constrained environments, devices typically communicate with a handful of entities, sometimes, even with a single entity such as CoAP proxy or a CoAP server. Therefore, the number of devices for which the blockchain 12 maintains records would be two or three. However, it will be appreciated that the number of entities party to the blockchain 12 may be any suitable number and is not limited to two or three devices. It will also be appreciated that the secure communication system 10 may be implemented in any suitable environment even when the client devices 14 are non-constrained devices. The secure communication system 10 is described herein with respect to the DTLS or TLS protocol. However, it will be appreciated by one ordinarily skilled in the art that the secure communication system 10 may be implemented with any suitable security protocol.

Cryptographic information may be stored in the blockchain 12 for later retrieval by the devices 14 when a secure connection is to be established between a client device of the devices 14 and a server of the devices 14. Each device 14 has a cryptographic information record (which may be divided into two or more records) in the blockchain 12 corresponding to that device 14, which includes one or more of the following: certificates, Distinguished Encoding Rules (DER) of SubjectPublicKeyInfo, pre-shared key identities, public keys, supported cipher suites and/or Hashed Message Authentication Code (HMAC)-based key derivation function (HKDF) pairs (optionally listed in decreasing order or preference), supported Elliptic Curve Diffie-Hellman Exchange (ECDHE) groups and ECDHE group key-shares for all of these groups (optionally listed in decreasing order of preference), pre-shared key exchange modes, supported versions of the security protocol being used in key derivation (e.g., TLS 1.3 or DTLS 1.3), other information that may be used in accordance with the security protocol. Each device 14 may have more than one cryptographic information record and may choose to expose a given record(s) to another device(s) 14, or a part of a given record(s) to another device(s) 14. The cryptographic information record(s) of each device 14 is written to the blockchain 12 prior to that device 14 setting up a secure connection, for example, but not limited to, when that device 14 is provisioned, before that device 14 is provisioned or any time after that device 14 is provisioned prior to setting up the secure connection. The cryptographic information records are described in more detail below with reference to FIGS. 2-5.

As part of setting up a secure connection, a transaction record is written to the blockchain 12 by a client device (e.g., one of the devices 14) trying to establish a secure connection with a server (e.g., another one of the devices 14). The server also writes another transaction record to the blockchain 12 as part of setting up the secure connection. Each transaction record (of the client device and the server) may include details about the secure connection, and this may include one or more of the following: a nonce for use in key generation of that session, the final selected Authenticated Encryption with Associated Data (AEAD) Algorithm and/or Hashed Message Authentication Code (HMAC)-based key derivation function (HKDF) pair of that session, timestamp of the transaction, identifier of the peer with whom a secure connection is to be established, and/or keying material. In some embodiments, the transaction record written by the client or server may divided into two or more transaction records. The transaction records are described in more detail below with reference to FIGS. 2-5.

Figure 2:
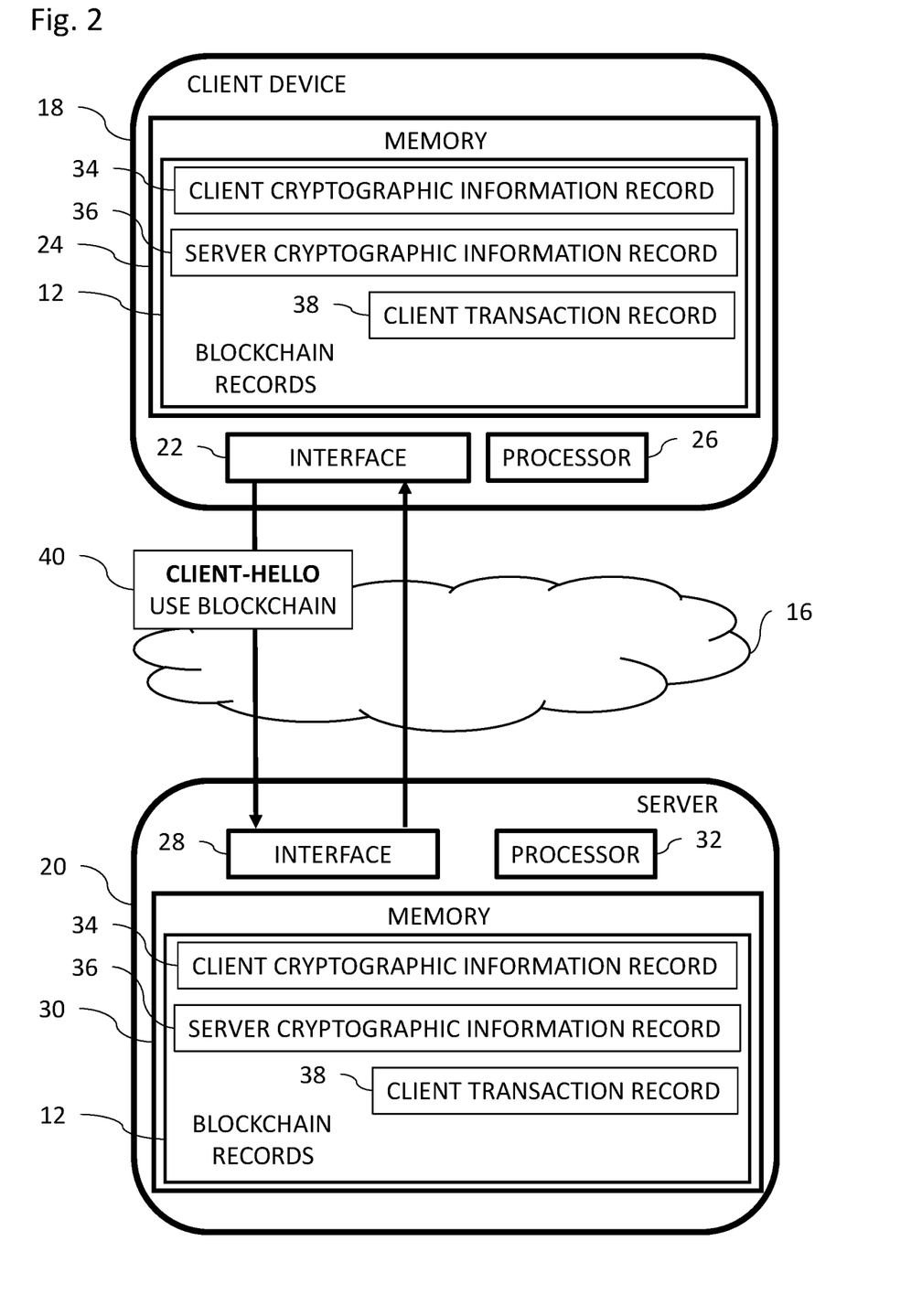
FIG. 2 is a block diagram view of a client device and a server setting-up secure communication in the system of FIG. 1.

Reference is now made to FIG. 2, which is a block diagram view of a client device 18 and a server 20 setting-up secure communication in the system 10 of FIG. 1. The client device 18 (corresponding to one of the devices 14 of FIG. 1) includes: an interface 22; a processor 26; and a memory 24 to store at least part of the blockchain 12 and data used by the processor 26. The server 20 (corresponding to another one of the devices 14 of FIG. 1) includes: an interface 28; a processor 32; and a memory 30 to store at least part of the blockchain 12 and data used by the processor 32. Each interface 22, 28 may include two or more sub interfaces, which may be the same type of interface or may be different types of interface.

The part of the blockchain 12, stored in the memory 24 of the client device 18 and in the memory 30 of the server 20, includes a client cryptographic information record 34 of the client device 18 and a server cryptographic information record 36 of the server 20. The cryptographic information records 34, 36 and the transaction records (described in more detail below) of the client device 18 and the server 20 generally provide enough cryptographic key generation information to generate cryptographic keys and establish a secure connection. Each cryptographic information record 34, 36 may include any one or more of the following items for the node (e.g., the client device 18 or the server 20) for which the cryptographic information record 34, 36 was generated: certificates, Distinguished Encoding Rules (DER) of SubjectPublicKeyInfo, pre-shared key identities, public keys, supported cipher suites and/or Hashed Message Authentication Code (HMAC)-based key derivation function (HKDF) pairs (optionally listed in decreasing order or preference), supported Elliptic Curve Diffie-Hellman Exchange (ECDHE) groups and ECDHE group key-shares for all of the groups (optionally listed in decreasing order of preference), pre-shared key exchange modes, supported versions of the security protocol being used in key derivation (e.g., TLS 1.3 or DTLS 1.3), and/or other information that may be used in accordance with the security protocol. The client cryptographic information record 34 and the server cryptographic information record 36 typically include different information although some of the data is generally the same in each of the cryptographic information records 34, 36. The cryptographic information records 34, 36 are maintained independently for the client device 18 and the server 20. One reason for maintaining independent cryptographic information records 34, 36 is that the client device 18 and the server 20 use at least some of the information in the cryptographic information records 34, 36 as a basis to understand what security capabilities the client device 18 and server 20 have in common, in terms of cipher suite and/or HKDF Pairs, supported ECDHE groups, key-shares for a chosen ECDHE group and pre-shared key identities.

Establishing a secure channel is now described based on a decision by the client device 18 to communicate with the server 20. The client device 18 generates a random or pseudo-random client nonce and writes the client nonce in a client transaction record 38, which is written in the blockchain 12. It should be noted that the client device 18 generally writes data to a local copy of at least part of the blockchain 12 stored in the memory 24 of the client device 18. The written data may then be copied to at least part of the blockchain 12 stored in the server 20. Similarly, the server 20 generally writes data to a local copy of at least part of the blockchain 12 stored in the memory 30 of the server 20. The written data may then be copied to at least part of the blockchain 12 stored in the client device 18. At least part of the blockchain 12 locally stored on any one of the devices 14 (client device or server) may include all the records (the cryptographic information records and/or the transaction records) of the blockchain 12 or some of the records (any of the cryptographic information records and/or any of the transaction records) of the blockchain 12. For example, the cryptographic information records of all the devices 14 may be locally stored in (the part of) the blockchain 12 on each of the devices 14 (client devices and server(s)), whereas the transaction records may be selectively stored such that the device 14 (client device or server) which either created the transaction record or which is mentioned in the transaction record has that transaction record stored in its local copy of (the part of) the blockchain 12. By way of another example, where the server 20 communicates with the client devices of the devices 14, but the client devices of the devices 14 do not communicate among themselves, the server cryptographic information records may be stored in the part of the blockchain 12 stored on the client devices of the devices 14 and on the server 20, the client cryptographic information records may be stored in the blockchain 12 of the server 20, and the transaction records may be selectively stored such that the device 14 (client device or server) which either created the transaction record or which is mentioned in the transaction record has that transaction record stored in its local copy of (the part of) the blockchain 12. In any event, when one of the devices 14 writes a record to the blockchain 12, the writing is generally to a local copy of the blockchain 12, which may include all or some of the records of the blockchain 12 as described above.

The client device 18 also writes one or more of the following in the client transaction record 38 in the blockchain 12: an identifier of a remote peer (e.g., the server 20) and a timestamp in Coordinated Universal Time (UTC) or any other suitable unit of time. The inclusion of an identifier of the server 20 in the client transaction record 38 allows the server 20 to read the client transaction record 38 and also results in the client transaction record 38 being copied into the copy of the blockchain 12 stored in the memory 30 of the server 20.

The client device 18 prepares a client hello message 40. The client hello message 40 includes an extension indicating use of the blockchain 12 in the setup of a secure connection. The client hello message 40 may also include a version of the security protocol, e.g., TLS 1.3, which may be used to determine cryptographic key(s). The client device 18 sends the client hello message 40 to the server 20.

The client device 18 does not need to include any other parameters in the client hello message 40. If the server 20 does not understand the formatting of the client hello message 40, the server 20 may drop the client hello message 40 and abort the connection. In which case, the client device 18 may retry establishing a secure connection using another method, which does not include the blockchain 12, for example, but not limited to, standards based on TLS or DTLS (1.1, 1.2, or 1.3) depending on the capability of the client device 18.

The client transaction record 38 may be written to blockchain 12 by the client device 18 before the client hello message 40 is sent by the client device 18 to the server 20 so that on receipt of the client hello message 40 by the server 20, the server 20 may check the authenticity of the client hello message 40 by way of the information stored in the client transaction record 38. This check of authenticity is also described in more detail below with reference to FIG. 3. It will be appreciated that checking the authenticity of the client hello message 40 may be delayed until the client transaction record 38 is available, if for some reason availability of the client transaction record 38 is delayed. It will be appreciated that the client hello message 40 may be sent before, after, or at the same time that the client transaction record 38 is written to the blockchain 12. It will be appreciated that the client hello message 40 may be generated before, after, or at the same time as the generation of the client transaction record 38.

Figure 3:
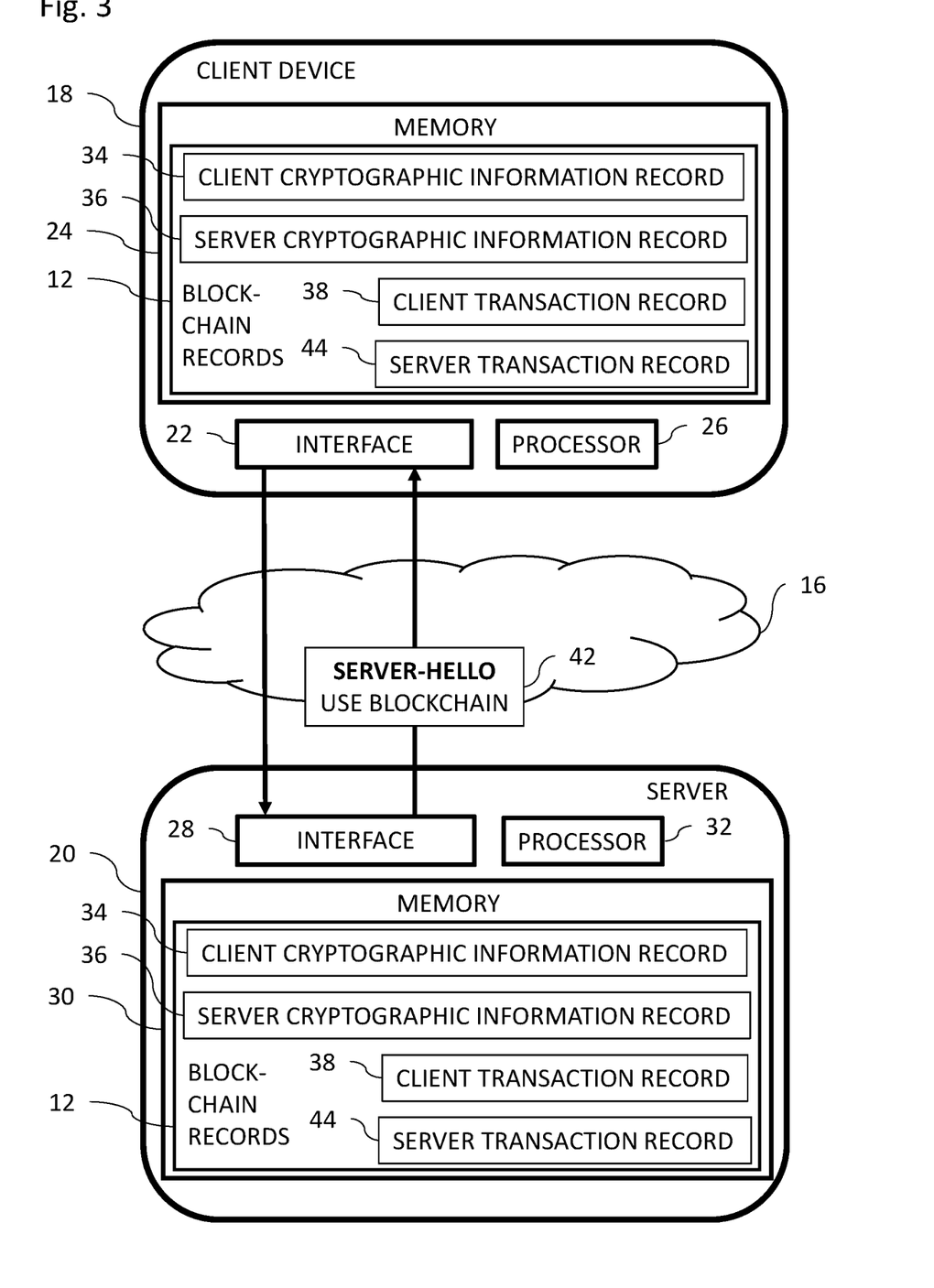
FIG. 3 is a block diagram view of the client device and the server of FIG. 2 finalizing the setting-up of secure communication.

Reference is now made to FIG. 3, which is a block diagram view of the client device 18 and the server 20 of FIG. 2 finalizing the setting-up of secure communication. On receiving the client hello message 40 (FIG. 2), if the server 20 is able to setup a secure connection using the blockchain 12, the server 20 authenticates that the client device 18 is not an adversary spoofing a legitimate client's IP address based on checking the identifier of the server 20 and the timestamp of this current transaction in the client transaction record 38. Therefore, the server 20, on receiving the client hello message 40 does not need to send a HelloRetryRequest as the client hello message 40 is authenticated based on the client transaction record 38. It should be noted that the term "does not need to" used herein, should be understood to mean that a particular action may be performed but does not need to be performed.

The server 20 generates a server hello message 42 and a server transaction record 44. The server hello message 42 includes an extension indicating use of the blockchain 12 in the setup of a secure connection. The server hello message 42 may also include a version of the security protocol, e.g., TLS 1.3, which will be used to determine cryptographic key(s). It should be noted that the client hello message 40 used to request support for blockchain mode and subsequently the server hello message 42 that echoes support for the blockchain mode are very different from Hello Messages according to the TLS or DTLS protocol that do not mention blockchain mode and may include other information in accordance with the TLS or DTLS protocol.

The server 20 generates a random or pseudo-random server nonce, which is written by the server 20 into the server transaction record 44, which is written in the blockchain 12. The server 20 also writes one or more of the following in the server transaction record 44 in the blockchain 12: an identifier of a remote peer (e.g., the client device 18) and a timestamp in UTC or any other suitable unit of time. The inclusion of an identifier of the client device 18 in the server transaction record 44 allows the client device 18 to read the server transaction record 44 and also results in the server transaction record 44 being copied into the copy of the blockchain 12 stored in the memory 24 of the client device 18.

The server 20 sends the server hello message 42 to the client device 18. The server transaction record 44 may be written to blockchain 12 before the server hello message 42 is sent by the server 20 to the client device 18 so that on receipt of the server hello message 42 by the client device 18, the client device 18 may read the server nonce from the server transaction record 44 and commence cryptographic key generation. It will be appreciated that the server hello message 42 may be sent before, after, or at the same time that the server transaction record 44 is written to the blockchain 12. It will be appreciated that the server hello message 42 may be generated before, after, or at the same time as the generation of the server transaction record 44.

Once the client device 18 and the server 20 have both decided to use the blockchain 12, indicated by the sending of the client hello message 40 and the server hello message 42, the following is performed. The client device 18 probes the server cryptographic information record 36 and the server transaction record 44 stored in the blockchain 12 in the memory 24 of the client device 18 for cryptographic key generation information including the server nonce and to understand what security capabilities the client device 18 and server 20 have in common, in term of cipher suite and/or HKDF Pairs, supported ECDHE groups, key-shares for a chosen ECDHE group and pre-shared key identities among other information. The server 20 probes the client cryptographic information record 34 and the client transaction record 38 stored in the blockchain 12 in the memory 30 of the server 20 for cryptographic key generation information including the client nonce, and to understand what security capabilities the client device 18 and server 20 have in common, as described above.

It will be appreciated that the client device 18 may also probe the client cryptographic information record 34 and/or the client transaction record 38 and/or other stored information to access information for use in the cryptographic key generation process. Similarly, the server 20 may also probe the server cryptographic information record 36 and/or server transaction record 44 and/or other stored information to access information for use in the cryptographic key generation process.

The client device 18 and the server 20 may select the cipher Suite and/or HKDF Pairs that are the highest in the list in both the client cryptographic information record 34 and the server cryptographic information record 36. It will be appreciated that a suitable selection algorithm may be used to determine which is the common highest cipher suite and/or HKDF pair.

The retrieved cryptographic key generation information is used as a feeder for the client device 18 and server 20 to calculate the handshake traffic key(s) (even though the client device 18 and the server 20 do not need to use the handshake keys to encrypt handshake messages) and application traffic key(s). The client device 18 and the server 20 both independently calculate the handshake traffic key(s) and application traffic key(s) and possibly other keys according to the security protocol being used. The handshake traffic key(s) are generally different from the application traffic key(s). Assuming, the key calculation is performed correctly, the handshake traffic key(s) calculated by the client device 18 should be the same as the handshake traffic key(s) calculated by the server 20 and the application traffic key(s) calculated by the client device 18 should be the same as the application traffic key(s) calculated by the server 20. The handshake traffic key(s) and application traffic key(s) and possibly other keys may be calculated in accordance with a key generation process of a security protocol, for example, but not limited to DTLS 1.3 or TLS 1.3. It will be appreciated by one of ordinary skill in the art that the handshake traffic key(s) and application traffic key(s) and possibly other keys may be calculated in accordance with any suitable key generation process of any suitable security protocol or method. It should be noted that as the normal flight of TLS/DTLS handshake messages is not needed in accordance with the present disclosure, the key generation procedure in the secure communication system 10 may be different from that normally used in DTLS 1.3 or TLS 1.3 and the client device 18 and the server 20 may modify the handshake context and transcript hash in this respect.

As stages in the key generation process advance, both the client device 18 and the server 20 may write any one or more of the following to the client transaction record 38 and the server transaction record 44, respectively: the final selected AEAD Algorithm and/or HKDF pair; early secrets (if using pre-shared keys); client and server handshake traffic key(s); master secret; and/or application traffic key(s). It should be noted that there is no need for handshake messages subsequent to the server hello message 42, because calculation of the handshake traffic key(s) provides the master secret with entropy.

As the client device 18 writes data (e.g., the final selected AEAD Algorithm and/or HKDF pair, early secrets (if using pre-shared keys), client and server handshake traffic key(s), master secret, and/or application traffic key(s)) to the client transaction record 38 in the blockchain 12, the data update is mirrored in the client transaction record 38 stored in the blockchain 12 in the memory 30 of the server 20. The server 20 reads the data (e.g., the final selected AEAD Algorithm and/or HKDF pair, early secrets (if using pre-shared keys), client and server handshake traffic key(s), master secret, and/or application traffic key(s)) from the client transaction record 38 and compares the data to the data (e.g., the final selected AEAD Algorithm and/or HKDF pair, early secrets (if using pre-shared keys), client and server handshake traffic key(s), master secret, and/or application traffic key(s)) determined/generated by the server 20. The server 20 may read and compare the data as each data item is written to the client transaction record 38 or the server 20 may read and compare data items once all the data items have been written to the client transaction record 38 or any suitable combination. Similarly, after the server 20 writes data (e.g., the final selected AEAD Algorithm and/or HKDF pair, early secrets (if using pre-shared keys), client and server handshake traffic key(s), master secret, and/or application traffic key(s)), to the server transaction record 44 in the blockchain 12, the update is mirrored in the server transaction record 44 stored in the blockchain 12 in the memory 24 of the client device 18. The client device 18 reads the data from the server transaction record 44 and compares the data from the server transaction record 44 to data determined/generated by the client device 18. The above crosscheck of data in the server transaction record 44 and the client transaction record 38 by the client device 18 and the server 20, respectively, ensures that there is a unified view of the keying material. Additionally, TLS or DTLS Finished messages for crosschecking generated keys are not needed based on the above crosscheck of data. If the client device 18 and the server 20 do not generate the same set of cryptographic keys, this is an indication that the key computation may be faulty or has been falsely manipulated and the connection may be aborted by the client device 18 and/or the server 20.

In accordance with TLS or DTLS, when a client and server authenticate each other using raw public key certificates, a certificate message (which includes a value corresponding to the node certificate, and generally not the entire certificate) from either the server or the client is used. In accordance with the secure communication system, 10 a certificate message may be redundant because the DER/ASN.1 encoding of the certificate may already be included in the client cryptographic information record 34 or the server cryptographic information record 36. To overcome the limitation of binding the raw public keys to the entity presenting the raw public keys, in accordance with the secure communication system 10, each node (the client device 18 and/or the server 20) may sign the content covered by the digital signature with its corresponding private key and write the value into the client transaction record 38 (by the client device 18) or the server transaction record 44 (by the server 20). The peer node may then read this value to verify the binding.

Figure 4:
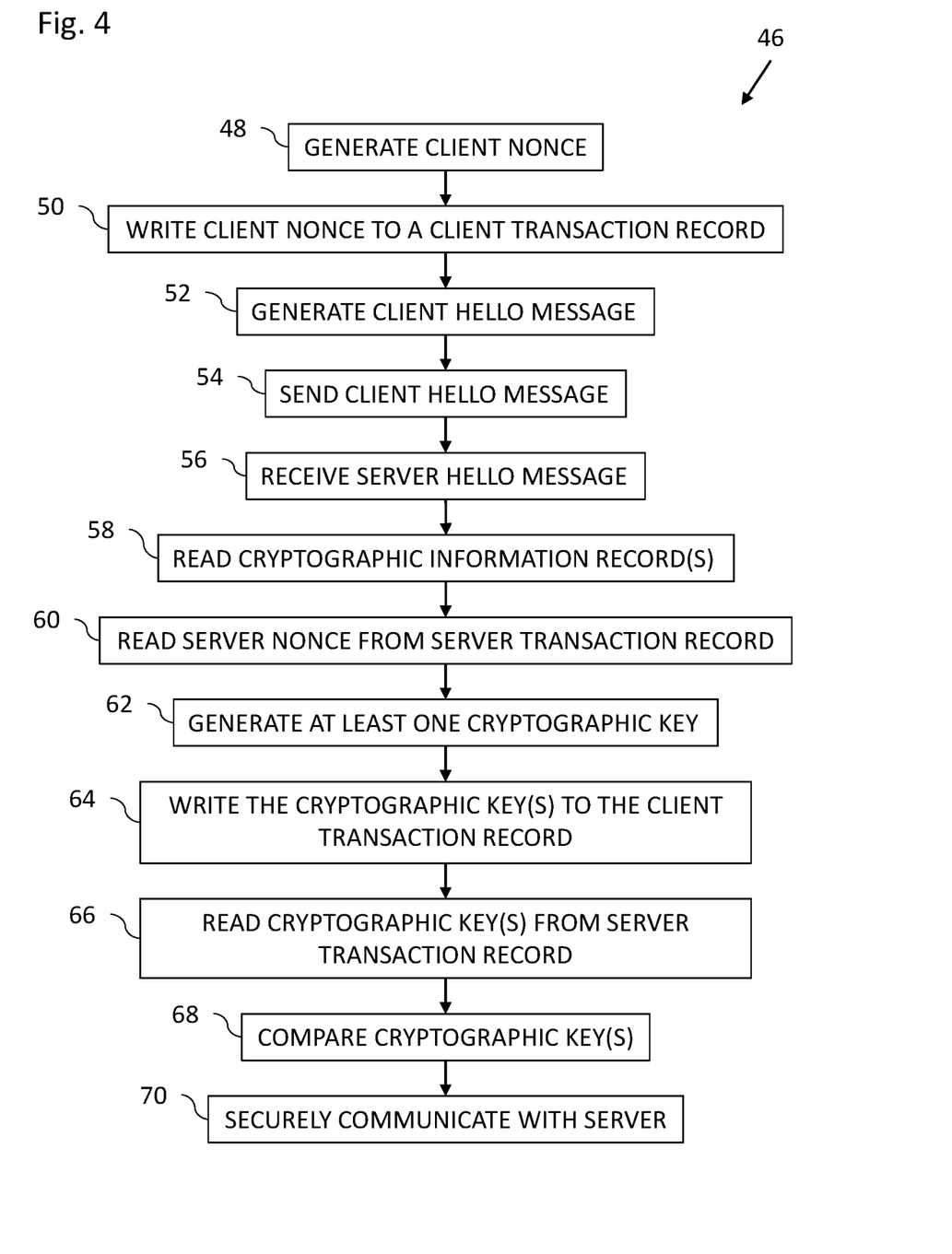
FIG. 4 is a flow chart including exemplary steps in a method of operation of the client device of FIGS. 2 and 3.

Reference is now made to FIG. 4, which is a flow chart 46 including exemplary steps in a method of operation of the client device 18 of FIGS. 2 and 3. Reference is also made to FIG. 3. The processor 26 of the client device 18 is operative to generate a client nonce (block 48). The processor 26 is operative to write the client nonce to the client transaction record 38 in the blockchain 12 (block 50). The processor 26 is operative to generate the client hello message 40 (FIG. 2) including an extension indicating use of blockchain mode to establish a secure connection between the client device 18 and the server 20 (block 52). The processor 26 is operative to send the client hello message 40 to the server 20 on the interface 22 (block 54). The processor 26 is operative to receive, from the server 20, on the interface 22, the server hello message 42 including an extension indicating use of the blockchain mode (block 56). The processor 26 is operative to read the server cryptographic information record 36 and optionally the client cryptographic information record 34 stored in the blockchain 12 (block 58). The processor 26 is operative to read a server nonce generated by the server 20 from the server transaction record 44 written to the blockchain 12 by the server 20 (block 60). The processor 26 is operative to generate at least one cryptographic key (e.g., server handshake traffic key(s), master secret, and/or application traffic key(s)) from information including: cryptographic key generation information stored in the client cryptographic information record 34 and/or stored in the server cryptographic information record 36; the client nonce; the server nonce; and optionally other information included in the server transaction record 44 (block 62). The processor 26 is operative to write the cryptographic key(s) to the client transaction record 38 or to another client transaction record in the blockchain 12 for reading by the server 20 (block 64). The processor 26 is operative to read the cryptographic key(s) from the server transaction record 44 or from another server transaction record written to the blockchain 12 by the server 20 (block 66). The processor 26 is operative to compare the cryptographic key(s) read from the server transaction record to the cryptographic key(s) generated by the processor 26 of the client device 18 (block 68). If the compared keys do not match, the connection may be dropped. The processor 26 is operative to securely communicate with the server 20, on the interface 22, using the cryptographic key(s) generated from information including cryptographic key generation information stored in the blockchain 12 (block 70). It will be appreciated that any of the above steps may be performed in any suitable order unless a step is dependent on another step, by way of example.

Figure 5:
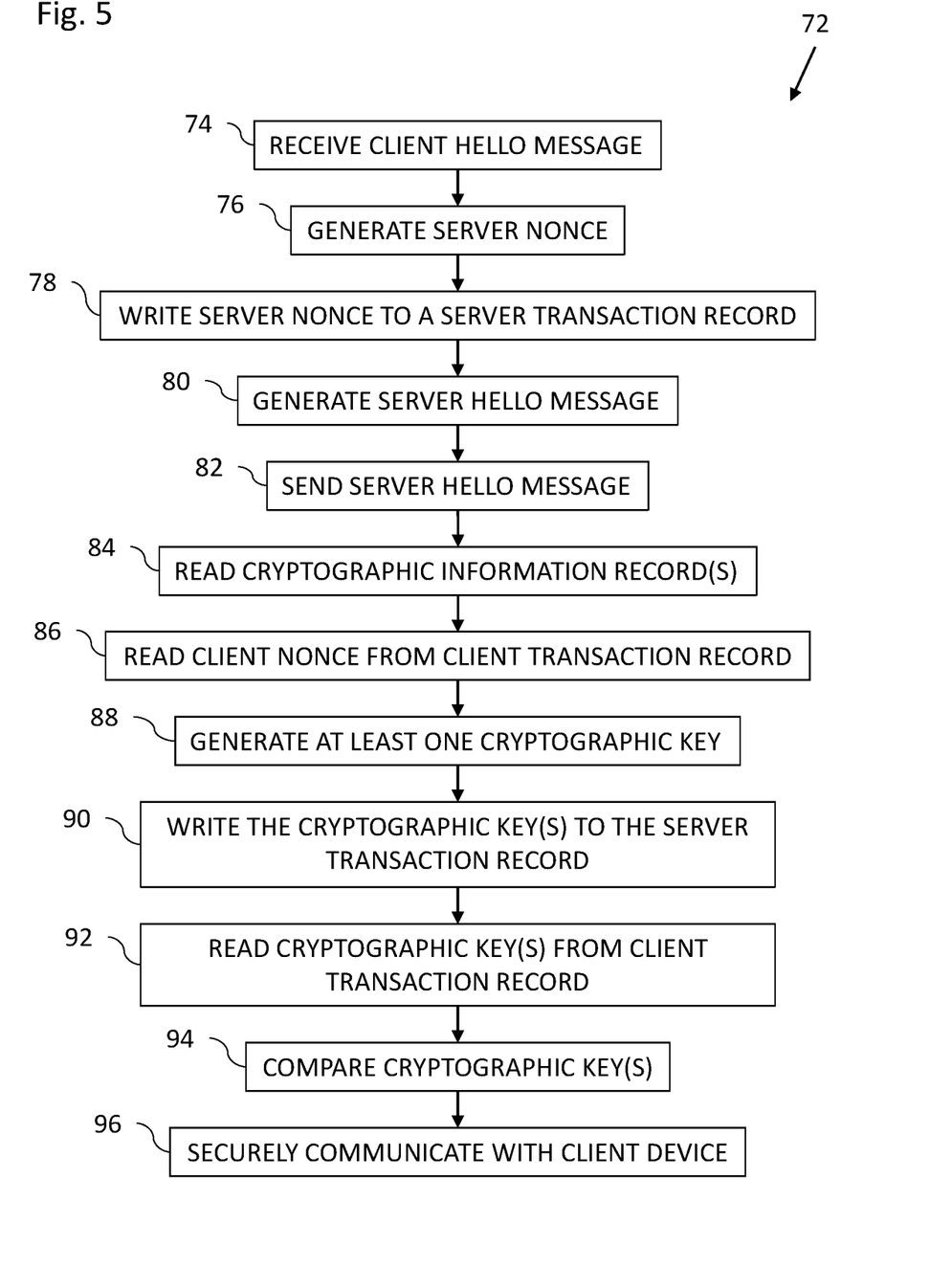
FIG. 5 is a flow chart including exemplary steps in a method of operation of the server of FIGS. 2 and 3.

Reference is now made to FIG. 5, which is a flow chart 72 including exemplary steps in a method of operation of the server 20 of FIGS. 2 and 3. Reference is also made to FIG. 3. The processor 32 of the server 20 is operative to receive, from the client device 18, on the interface 28, the client hello message 42 including an extension indicating use of blockchain mode to establish a secure connection between the client device 18 and the server 20 (block 74). The processor 32 is operative to generate a server nonce (block 76). The processor 32 is operative to write the server nonce to the server transaction record 44 in the blockchain 12 (block 78). The processor 32 is operative to generate the server hello message 42 including an extension indicating use of the blockchain mode (block 80). The processor 32 is operative to send the server hello message 42 to the client device 18 on the interface 28 (block 82). The processor 32 is operative to read the client cryptographic information record 34 of the client device 18 stored in the blockchain 12 and optionally read the server cryptographic information record 36 of the server 18 stored in the blockchain 12 (block 84). The processor 32 is operative to read a client nonce generated by the client device 18 from the client transaction record 38 written to the blockchain 12 by the client device 18 (block 86). The processor 32 is operative to generate at least one cryptographic key (e.g., server handshake traffic key(s), master secret, and/or application traffic key(s)) from information including: cryptographic key generation information stored in the client cryptographic information record 34 and/or the server cryptographic information record 36; the server nonce; the client nonce; and optionally other information included in the client transaction record 38 (block 88). The processor 32 is operative to write the cryptographic key(s) to the server transaction record 44 or another server transaction record in the blockchain 12 for reading by the client device 18 (block 90). The processor 32 is operative to read the cryptographic key(s) from the client transaction record 38 or from another client transaction record written to the blockchain 12 by the client device 18 (block 92). The processor 32 is operative to compare the cryptographic key(s) read from the client transaction record to the cryptographic key(s) generated by the processor 32 of the server 20 (block 94). If the compared keys do not match, the connection may be dropped. The processor 32 is operative to securely communicate with the client device 18, on the interface 28, using cryptographic key(s) generated from information including cryptographic key generation information stored in the blockchain 12 (block 96). It will be appreciated that any of the above steps may be performed in any suitable order unless a step is dependent on another step, by way of example.

Other embodiments are now described below. It will be appreciated that the different embodiments described below may be combined in any suitable combination. In accordance with some embodiment of the present disclosure, the client nonce may be in included in the client hello message 40 instead of, or in addition to, being written in the client transaction record 38. In accordance with some embodiments of the present disclosure, the server nonce may be in included in the server hello message 42 instead of, or in addition to, being written in the server transaction record 44. In accordance with some embodiments of the present disclosure, the client device 18 may generate the relevant key(s) and write the key(s) in the client transaction record 38 for the server 20 to read and use without the server 20 having to generate the key(s). In accordance with some embodiments of the present disclosure, the server 20 may generate the relevant key(s) and write the key(s) in the server transaction record 44 for the client device 18 to read and use without the client device 18 having to generate the key(s). In accordance with some embodiments of the present disclosure, the client device 18 may encode (e.g., as a cryptographic hash) the generated key(s) in a finished message (instead of, or in addition to, being written in the client transaction record 38) for sending to the server 20 for checking. In accordance with some embodiments of the present disclosure, the server 20 may encode (e.g., as a cryptographic hash) the generated key(s) in a finished message (instead of, or in addition to, being written in the server transaction record 44) for sending to the client device 18 for checking. In accordance with some embodiments of the present disclosure, some of the information included in the cryptographic information record(s) and/or the transaction record(s) may be conveyed from the client device 18 to the server 20, and/or from the server 20 to the client device 18, in one or more hello messages, and/or in one or more other handshake messages.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A client device comprising:
an interface;
a memory to store at least one part of a blockchain; and
a processor to:
generate a client message to establish a secure connection between the client device and a server and to request support of a blockchain mode from the server;
send the client message to the server on the interface;
receive, from the server on the interface, a server message indicating the support of the blockchain mode; and
securely communicate with the server, on the interface, using at least one cryptographic key generated from information including cryptographic key generation information stored in the blockchain.

2. The client device according to claim 1, wherein the processor is operative to:
read a client cryptographic information record of the client device stored in the blockchain and/or a server cryptographic information record of the server stored in the blockchain; and
generate the at least one cryptographic key from information including cryptographic key generation information stored in the client cryptographic information record and/or the server cryptographic information record.

3. The client device according to claim 2, wherein the processor is operative to write the at least one cryptographic key to a first client transaction record in the blockchain for reading by the server.

4. The client device according to claim 3, wherein the processor is operative to:
read the at least one cryptographic key from a first server transaction record written to the blockchain by the server; and
compare the at least one cryptographic key read from the first server transaction record to the at least one cryptographic key generated by the processor of the client device.

5. The client device according to claim 4, wherein the processor is operative to:
generate a client nonce;
write the client nonce to the first client transaction record or a second client transaction record in the blockchain; and
generate the at least one cryptographic key from information including the client nonce.

6. The client device according to claim 5, wherein the processor is operative to:
read a server nonce generated by the server from the first server transaction record or a second server transaction record written to the blockchain by the server; and
generate the at least one cryptographic key from information including the client nonce and the server nonce.

7. The client device according to claim 4, wherein the processor is operative to:
generate a client nonce;
read a server nonce generated by the server from the first server transaction record or a second server transaction record written to the blockchain by the server; and
generate the at least one cryptographic key from information including the client nonce and the server nonce.

8. The client device according to claim 2, wherein the processor is operative to:
generate a client nonce;
read a server nonce generated by the server from a first server transaction record written to the blockchain by the server; and
generate the at least one cryptographic key from information including the client nonce and the server nonce.

9. The client device according to claim 8, wherein the processor is operative to write the client nonce to a first client transaction record in the blockchain.

10. The client device according to claim 1, wherein the processor is operative to:
read the at least one cryptographic key from a first server transaction record written to the blockchain by the server, and wherein generating the client message includes adding an extension to the client message indicating that the client device supports the blockchain mode.

11. A server comprising:
an interface;
a memory to store at least one part of a blockchain;
a processor to:
  receive, from a client device on the interface, a client message to establish a secure connection between the client device and the server and to request support of a blockchain mode from the server;
  generate a server message indicating the support of the blockchain mode;
  send the server message to the client device on the interface; and
  securely communicate with the client device, on the interface, using at least one cryptographic key generated from information including cryptographic key generation information stored in the blockchain.

12. The server according to claim 11, wherein the processor is operative to:
  read a client cryptographic information record of the client device stored in the blockchain and/or a server cryptographic information record of the server stored in the blockchain; and
  generate the at least one cryptographic key from information including cryptographic key generation information stored in the client cryptographic information record and/or the server cryptographic information record.

13. The server according to claim 12, wherein the processor is operative to write the at least one cryptographic key to a first server transaction record in the blockchain for reading by the client device.

14. The server according to claim 13, wherein the processor is operative to:
  read the at least one cryptographic key from a first client transaction record written to the blockchain by the client device; and
  compare the at least one cryptographic key read from the first client transaction record to the at least one cryptographic key generated by the processor of the server.

15. The server according to claim 14, wherein the processor is operative to:
  generate a server nonce; write the server nonce to the first server transaction record or a second server transaction record in the blockchain; and
  generate the at least one cryptographic key from information including the server nonce.

16. The server according to claim 15, wherein the processor is operative to:
  read a client nonce generated by the client device from the first client transaction record or a second client transaction record written to the blockchain by the client device; and
  generate the at least one cryptographic key from information including the client nonce and the server nonce.

17. The server according to claim 14, wherein the processor is operative to:
  generate a server nonce;
  read a client nonce generated by the client device from the first client transaction record or a second client transaction record written to the blockchain by the client device; and
  generate the at least one cryptographic key from information including the client nonce and the server nonce.

18. The server according to claim 11, wherein the processor is operative to:
  read the at least one cryptographic key from a first client transaction record written to the blockchain by the client device.

19. A method comprising:
  storing at least one part of a blockchain;
  generating a client message to establish a secure connection between a client device and a server and to request support of a blockchain mode from the server;
  sending the client message to the server;
  receiving, from the server, a server message indicating the support of the blockchain mode; and
  securely communicating with the server using at least one cryptographic key generated from information including cryptographic key generation information stored in the blockchain.

20. The method according to claim 19, further comprising:
  reading a client cryptographic information record of the client device stored in the blockchain and/or a server cryptographic information record of the server stored in the blockchain; and
  generating the at least one cryptographic key from information including cryptographic key generation information stored in the client cryptographic information record and/or the server cryptographic information record.

* * * * *